United States Patent
Lee et al.

(10) Patent No.: US 10,451,871 B2
(45) Date of Patent: Oct. 22, 2019

(54) HEAD-UP DISPLAY SYSTEM

(71) Applicant: Coretronic Corporation, Hsin-Chu (TW)

(72) Inventors: Chun-Wei Lee, Hsin-Chu (TW); Bai-Nan Ni, Hsin-Chu (TW); Chin-Hsiang Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/393,248

(22) Filed: Dec. 29, 2016

(65) Prior Publication Data

US 2017/0199379 A1    Jul. 13, 2017

(30) Foreign Application Priority Data

Jan. 8, 2016    (TW) .............................. 105100489 A

(51) Int. Cl.
*G02B 27/01*    (2006.01)

(52) U.S. Cl.
CPC ......... *G02B 27/0101* (2013.01); *G02B 27/01* (2013.01); *G02B 2027/0118* (2013.01); *G02B 2027/0145* (2013.01); *G02B 2027/0147* (2013.01)

(58) Field of Classification Search
CPC ........ G02B 27/0101; G02B 2027/1045; G02B 2027/0118; G02B 2027/0147; G02B 27/01
USPC ................................................ 359/630–633
See application file for complete search history.

(56) References Cited

U.S. PATENT DOCUMENTS

| 8,169,311 | B1 | 5/2012 | Breed |
| 2011/0175798 | A1* | 7/2011 | Sato ...................... B60K 35/00 345/7 |
| 2014/0313586 | A1 | 10/2014 | Jan et al. |
| 2015/0145839 | A1* | 5/2015 | Hack .................... G09G 3/3208 345/207 |

FOREIGN PATENT DOCUMENTS

| CN | 1896836 | 1/2007 |
| JP | 2015087444 | 5/2015 |
| TW | 201219828 | 5/2012 |

* cited by examiner

*Primary Examiner* — Evan P Dzierzynski
*Assistant Examiner* — Mitchell T Oestreich
(74) *Attorney, Agent, or Firm* — JCIPRNET

(57) ABSTRACT

A head-up display system includes a display unit and a reflective element. The display unit having a first and a second display areas includes a display panel, a first light source module, and a second light source module. The display panel has a first and a second pixel areas. The first and the second light source modules respectively provide a first and a second light sources. The first light source corresponds to the first pixel area to make the first display area display a first image frame. The second light source corresponds to the second pixel area to make the second display area display a second image frame. The reflective element is located on a transmission path of the first image frame and not located on a transmission path of the second image frame, and reflects the first image frame from the first display area to a target element.

15 Claims, 8 Drawing Sheets

HEAD-UP DISPLAY SYSTEM

CROSS-REFERENCE TO RELATED APPLICATION

This application claims the priority benefit of Taiwan application serial no. 105100489, filed on Jan. 8, 2016. The entirety of the above-mentioned patent application is hereby incorporated by reference herein and made a part of this specification.

BACKGROUND OF THE INVENTION

1. Field of the Invention

The invention relates to a display system, and more particularly, to a head-up display system.

2. Description of Related Art

With yearly rising demands of electronic components used in vehicle, various display devices used in vehicle have been successively developed. A Head-Up Display (HUD) has been widely applied for displaying vehicle states or navigation messages.

Traditionally, a dashboard is disposed in front of the user, and the HUD is disposed above the dashboard. However, since the HUD and the dashboard are independently disposed, at least two display panels are required to serve as image sources of the HUD and the dashboard, respectively. Yet, when more display panels are to be used, the corresponding mechanism and the corresponding assembly steps will become more complex for the HUD and the dashboard. In addition, use of more display panels also derives the problem of high power consumption. Accordingly, it has become one of important issues in the field as how to solve the aforementioned problems.

The information disclosed in this "Description of Related Art" section is only for enhancement of understanding of the background of the invention and therefore it may contain information that does not form the prior art that is already known to a person of ordinary skill in the art. Furthermore, the information disclosed in this "Description of Related Art" section does not mean that one or more problems to be resolved by one or more embodiments of the invention were acknowledged by a person of ordinary skill in the art.

SUMMARY OF THE INVENTION

The invention is directed to a head-up display system which has simplified components and favorable imaging quality.

Other objects and advantages of the invention can be further illustrated by the technical features broadly embodied and described as follows.

To achieve one, a part, or all of the objects or other objects, an embodiment of the invention provides the head-up display system including a display unit and a reflective element. The display unit having a first display area and a second display area includes a display panel, a first light source module, and a second light source module. The display panel has a first pixel area and a second pixel area. The first light source module is adapted to provide a first light source. The first light source is corresponded to the first pixel area to make the first display area display a first image frame. The second light source module is adapted to provide a second light source. The second light source is corresponded to the second pixel area to make the second display area display a second image frame. The reflective element is located on a transmission path of the first image frame and not located on a transmission path of the second image frame, and adapted to reflect the first image frame from the first display area to a target element.

Based on the above, the head-up display system according to the embodiments of the invention uses two pixel areas (the first pixel area and the second pixel area) in one single display panel together with the first light source module and the second light source module to make two display areas (the first display area and the second display area) of one single display unit display two image frames (the first image frame and the second image frame), respectively. In the embodiments of the invention, the first image frame displayed by the first display area is reflected to the target element by the reflective element, and the first image frame rendered on the target element serves as the head-up display frame. In the embodiments of the invention, the second image frame displayed by the second display area serves as the dashboard display frame of the dashboard display panel. As such, the head-up display system according to the embodiments of the invention may simplify its components, avoid redundant assembly steps, save the space inside the vehicle, and reduce manufacturing costs as well as manufacturing hours. In addition, the head-up display system according to the embodiments of the invention may further save the power consumption, and is therefore suitable for electric vehicles (e.g., electric motor cars).

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
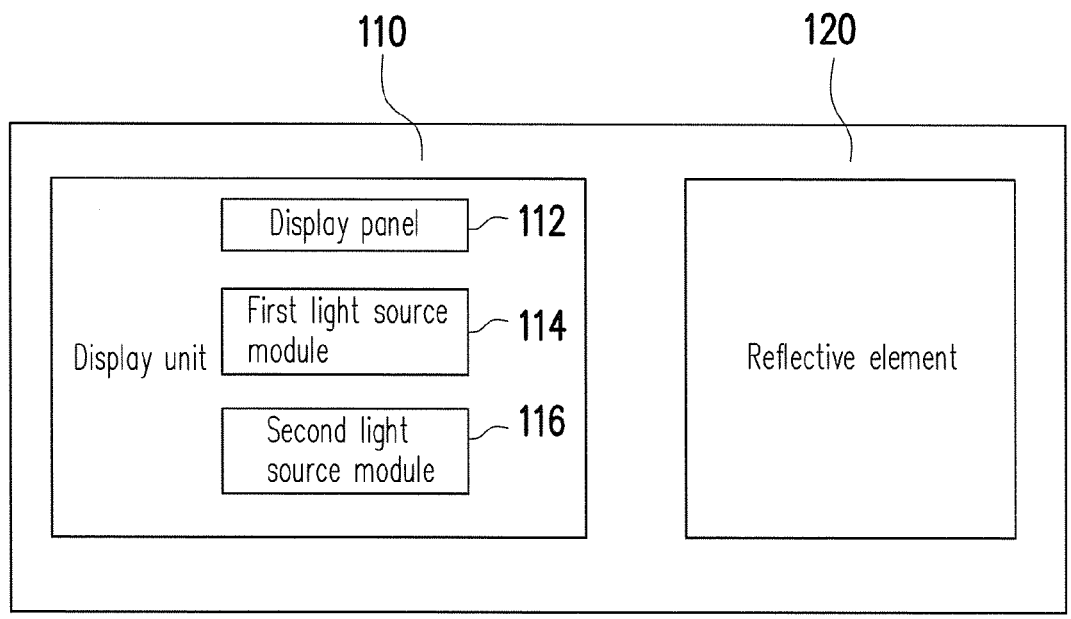
FIG. 1 is a block diagram illustrating a head-up display system according to an embodiment of the invention.

FIG. 1 is a block diagram illustrating a head-up display system according to an embodiment of the invention.

Referring to FIG. 1, a head-up display system 100 of the embodiment includes a display unit 110 and a reflective element 120. The display unit 110 includes a display panel 112, a first light source module 114, and a second light source module 116. Detailed introduction for each element in the head-up display system 100 is provided in the following paragraphs.

Figure 2:
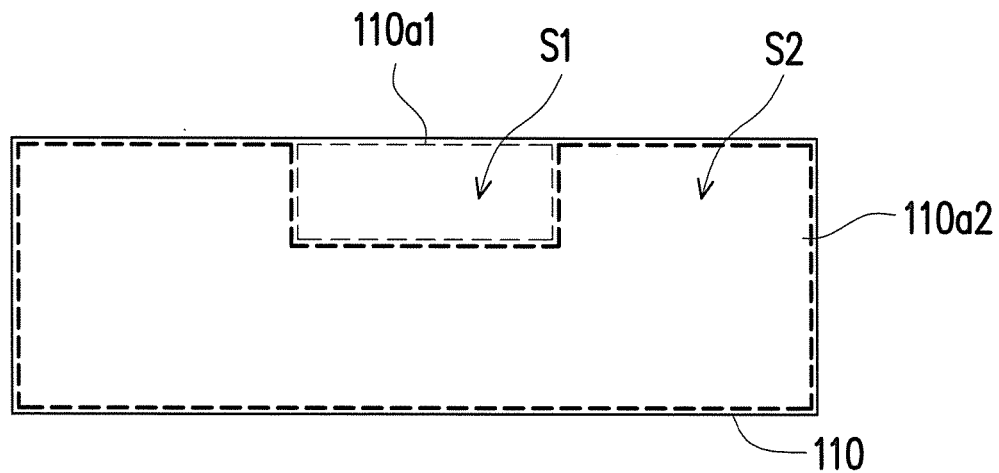
FIG. 2 is a schematic diagram illustrating the first display area and the second display area of the display unit.

FIG. 2 is a schematic diagram illustrating the first display area and the second display area of the display unit.

Referring to FIG. 2, in the embodiment, the display unit 110 has a first display area 110a1 (an area surrounded by thin dash lines in FIG. 2) and a second display area 110a2 (an area surrounded by thick dash lines in FIG. 2). The first display area 110a1 and the second display area 110a2 may locate at any positions in the display unit 110. The positions of the first display area 110a1 and the second display area 110a2 illustrated in FIG. 2 are merely examples, and the invention is not limited thereto. In view of the embodiment illustrated in FIG. 2, the first display area 110a1 is not overlapping with the second display area 110a2, and the first display area 110a1 is coplanar with the second display area 110a2. Further, in the embodiment, the first display area 110a1 of the display unit 110 is a head-up display panel serving as an image source of a head-up display frame, and the second display area 110a2 of the display unit 110 is a dashboard display panel serving as an image source of a dashboard display frame. In the embodiment, the head-up display system 100 may be configured to display vehicle states or navigation messages.

Figure 3:
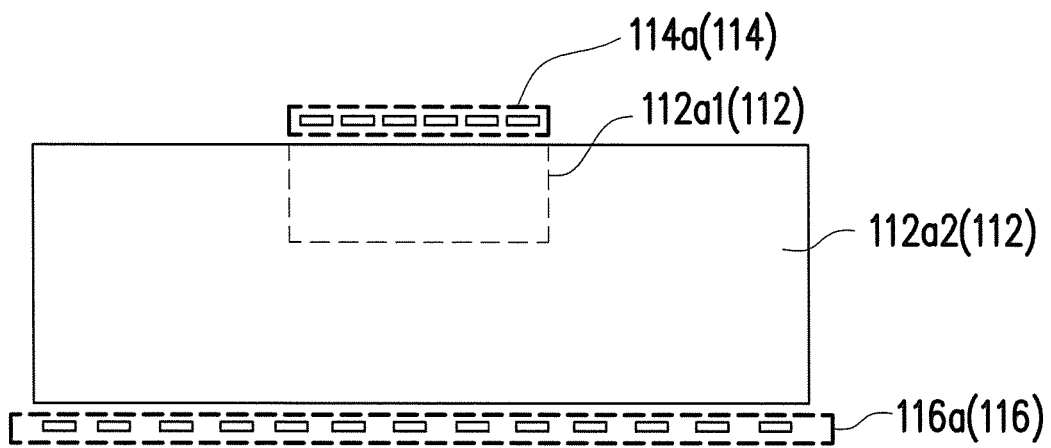
FIG. 3 is a schematic diagram illustrating the display panel, the first light source module and the second light source module in the display unit according to an embodiment of the invention.

FIG. 3 is a schematic diagram illustrating the display panel, the first light source module and the second light source module in the display unit according to an embodiment of the invention.

Referring to FIG. 3, in the embodiment, the display panel 112 is, for example, Thin Film Transistor Liquid Crystal Display (TFT LCD), but the invention is not limited thereto. In the embodiment, the display panel 112 has a first pixel area 112a1 and a second pixel area 112a2. In view of the embodiment illustrated in FIG. 3, the first pixel area 112a1 is an area surrounded by dash lines inside the display panel 112, and the second pixel area 112a2 is an area excluding the area surrounded by dash lines inside the display panel 112. That is to say, the first pixel area 112a1 is not overlapping with the second pixel area 112a2. Further, in the display panel 112 of the embodiment, the first pixel area 112a1 is, for example, an area surrounded by dash lines in the display panel 112 of FIG. 3, and the second pixel area 112a2 is an area excluding the area surrounded by dash lines in the display panel 112. However, both of the first pixel area 112a1 and the second pixel area 112a2 may locate at any areas in the display panel 112. The first pixel area 112a1 is not overlapping with the second pixel area 112a2. In other words, the areas illustrated in FIG. 3 are merely examples, and the invention is not limited thereto.

Referring to FIG. 2 and FIG. 3, in the embodiment, the first light source module 114 is, for example, a first backlight module adapted to provide a first light source. The first backlight module includes, for example, a plurality of first light emitting units (to simplify the illustration, a first light emitting bar 114a composed of multiple first light emitting units is used as an example, where the first light emitting bar 114a is configured to provide the first light source), but the invention is not limited thereto. The first light source provided by the first light source module 114 is corresponded to the first pixel area 112a1 to make the first display area 110a1 display a first image frame S1. On the other hand, in the embodiment, the second light source module 116 is, for example, a second backlight module adapted to provide a second light source. The second backlight module includes, for example, a plurality of second light emitting units (to simplify the illustration, a second light emitting bar 116a composed of multiple second light emitting units is used as an example, where the second light emitting bar 116a is configured to provide the second light source), but the invention is not limited thereto. The second light source provided by the second light source module 116 is corresponded to the second pixel area 112a2 to make the second display area 110a2 display a second image frame S2.

Referring back to the FIG. 2 and FIG. 3 together, specifically, in the embodiment, the first light source module 114 and the second light source module 116 are the first backlight module and the second backlight module respectively. Enough teaching, suggestion, and implementation illustration for implementations of aforesaid first and second backlight modules may be obtained with reference to common knowledge in the related art, which is not repeated hereinafter. For instance, components including reflective plate, Light Guide Plate (LGP), plastic frame (or plastic cover), front cover, back cover, polarizing plate, diffuser plate, prism plate or other suitable optical films may be further disposed in the first light source module 114 and/or the second light source module 116 based on design requirements, but the invention is not limited by aforementioned components.

Accordingly, in the embodiment, the first pixel area 112a1 is located on a transmission path of the first light source provided by the first backlight module (the first light source module 114), the second pixel area 112a2 is located on a transmission path of the second light source provided by the second backlight module (the second light source module 116), and the first pixel area 112a1 is coplanar with the second pixel area 112a2. Therefore, the first light source emitted by the first light source module 114 and the second light source emitted by the second light source module 116 are provided to the first pixel area 112a1 and the second pixel area 112a2 in the display panel 112 respectively, so as to make the first display area 110a1 and the second display area 110a2 of the display unit 110 display the first image frame S1 and the second image frame S2 respectively. In view of above, in the embodiment, the two pixel areas (the first pixel area 112a1 and the second pixel area 112a2) in one display panel 112 may be used together with the first light source module 114 (e.g., the first backlight module) and the second light source module 116 (e.g., the second backlight module) to achieve effectiveness of displaying two image frames (the first image frame S1 and the second image frame S2).

In addition, in the embodiment of FIG. 3, the first light source module 114 and the second light source module 116 are both described by using side incident type backlight modules for example. Naturally, the invention is not limited to the above combination. In the embodiment, the first light source module 114 (the first backlight module) is, for example, one selected from a direct type backlight module, a side incident type backlight module and a hybrid type backlight module, and the second light source module 116 (the second backlight module) is, for example, one selected from the direct type backlight module, the side incident type backlight module and the hybrid type backlight module. Herein, the hybrid type backlight module refers to a backlight module combined by the side incident type backlight module and the direct type backlight module. For instance, in one embodiment, the hybrid type backlight module may be composed of the first light source module 114 (the first backlight module) of the side incident type and the second light source module 116 (the second backlight module) of the direct type; in another embodiment, the hybrid type backlight module may be composed of the first light source module 114 (the first backlight module) of the direct type and the second light source module 116 (the second backlight module) of the side incident type.

Figure 4:
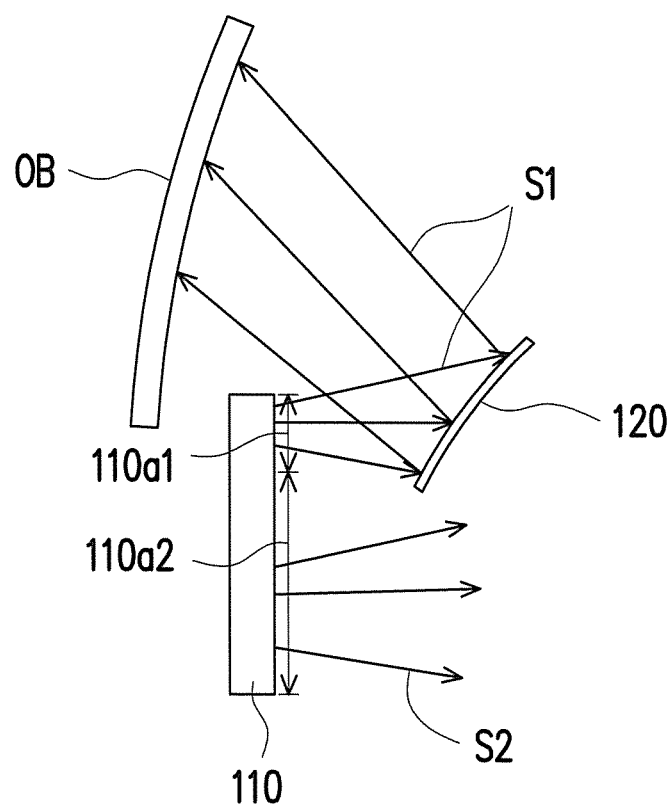
FIG. 4 is a schematic diagram illustrating side view of a head-up display system according to another embodiment of the invention.

FIG. 4 is a schematic diagram illustrating side view of a head-up display system according to another embodiment of the invention.

Referring to FIG. 4, in the head-up display system 100 of the embodiment, the reflective element 120 is located on a transmission path of the first image frame S1 and not located on a transmission path of the second image frame S2. The reflective element 120 is adapted to reflect the first image frame S1 from the first display area 110a1 to a target element OB. In the embodiment, the reflective element 120 is, for example, a mirror or other elements with reflection features, but the invention is not limited thereto. Specifically, the reflective element 120 is, for example, a convex mirror that has a convex surface facing towards the display unit 110/the target element OB. In other embodiments not illustrated, the reflective element 120 may also be a flat mirror. Alternatively, the reflective element 120 may also be a concave mirror that has a concave surface facing towards the display unit 110/the target element OB. In the embodiment, the distortion phenomenon occurred during imaging may be solved/prevented when the reflective element 120 is the convex mirror, such that the first image frame S1 may provide favorable optical image quality.

In view of above, the head-up display system 100 of the embodiment uses one display panel 112 to make the first display area 110a1 and the second display area 110a2 of the display unit 110 display the first image frame S1 and the second image frame S2 respectively. Herein, the first image frame S1 is reflected to the target element OB by the reflective element 120. Also, the first image frame S1 rendered on the target element OB serves as the head-up display frame and the second image frame S2 serves as the dashboard display frame of the dashboard display panel. In other words, frame sources of the display frames of the head-up display frame and the dashboard display frame are from the same display panel 112. As such, the head-up display system 100 of the embodiment may further simplify its design, avoid redundant assembly steps, save the space inside the vehicle, and reduce manufacturing costs as well as manufacturing hours. In the embodiment, the reflective element 120 is located on a transmission path of the first image frame S1 and not located on a transmission path of the second image frame S2. Accordingly, the first image frame S1 may be reflected by the reflective element 120, whereas the second image frame S2 may not be reflected by the reflective element 120. The intensity of luminance presented by the image frame (the first image frame S1 and the second image frame S2) is related to whether the image frame is reflected. For the design of luminance in the embodiment, a luminance of the first light source module 114 is, for example, not equal to a luminance of the second light source module 116. Specifically, in one embodiment, the luminance of the first light source module 114 is greater than the luminance of the second light source module 116. In another embodiment, a luminance of the first light source module 114 is substantially 13000 nits (1 nit=1 cd/m2), and a luminance of the second light source module 116 is substantially between 800 and 1000 nits. In other words, the luminance of the first light source module 114 is approximately 10 times the luminance of the second light source module 116. Based on such design, the luminance presented by the brighter first image frame S1 after being reflected to the target element OB by the reflective element 120 may be substantially identical to the luminance presented by the dimmer second image frame S2, such that the comfort in use of the system may be improved for the user.

However, the invention is not intended to limit the luminance of the first light source module and the second light source module. The luminance of the first light source module and the second light source module may be designed/adjusted in response to various usage/application requirements. For instance, in another embodiment, by increasing the luminance of the second light source module 116, the luminance of the first light source module 114 may be substantially equal to the luminance of the second light source module 116. In yet another embodiment, by decreasing the luminance of the first light source module 114, the luminance of the first light source module 114 may also be substantially equal to the luminance of the second light source module 116, so that the power consumption of the head-up display system 100 may be lower. In some embodiments, a luminance of the first image frame S1 may also be smaller than a luminance of the second image frame S2. In other embodiments not illustrated, the target element OB may locate at any position, and the first image frame S1 may be rendered on the target element OB through other reflective elements. Accordingly, the luminance of the first light source module 114 and/or the second light source module 116 may be adjusted to facilitate the first image frame S1 rendered on the target element OB for providing suitable luminance, so that versatility of the head-up display system 100 may be improved.

On the other hand, for the design of viewing angle in the embodiment, a viewing angle of the first light source module 114 is, for example, not equal to a viewing angle of the second light source module 116. Specifically, in one embodiment, the viewing angle of the first light source module 114 is smaller than the viewing angle of the second light source module 116. In another embodiment, a viewing angle of the first light source module 114 in vertical direction is substantially 26 degrees, a viewing angle of the first light source module 114 in horizontal direction is substantially 44 degrees, a viewing angle of the second light source module 116 in vertical direction is substantially 45 degrees, and a viewing angle of the second light source module 116 in horizontal direction is substantially 45 degrees. Based on such design, a viewing angle presented by the first image frame S1 having small viewing angle after being reflected to the target element OB by the reflective element 120 is substantially in consistent with a viewing angle presented by the second image frame S2 having large viewing angle. From another perspective, because the first light source module 114 has smaller viewing angle as compared to the second light source module 116, a luminance decay of the first image frame S1 may be relatively less than a luminance decay of the second image frame S2. Therefore, the luminance presented by the first image frame S1 after being reflected to the target element OB by the reflective element 120 may be substantially identical to the luminance presented by the second image frame S2.

However, the invention is not intended to limit the viewing angles of the first light source module and the second light source module. The viewing angles of the first light source module and the second light source module may be designed in response to various usage/application requirements. For instance, in yet another embodiment, a viewing angle of the first light source module 114 is substantially equal to a viewing angle of the second light source module 116. In another embodiment, a viewing angle of the first light source module 114 may be greater than a viewing angle of the second light source module 116. In other embodiments not illustrated, the target element OB may locate at any position, and the first image frame S1 may be rendered on the target element OB through other reflective elements. Accordingly, the viewing angles of the first light source module 114 and/or the second light source module 116 may be adjusted to facilitate the first image frame S1 rendered on the target element OB for providing suitable viewing angle, so that versatility of the head-up display system 100 may be improved.

Figure 5:
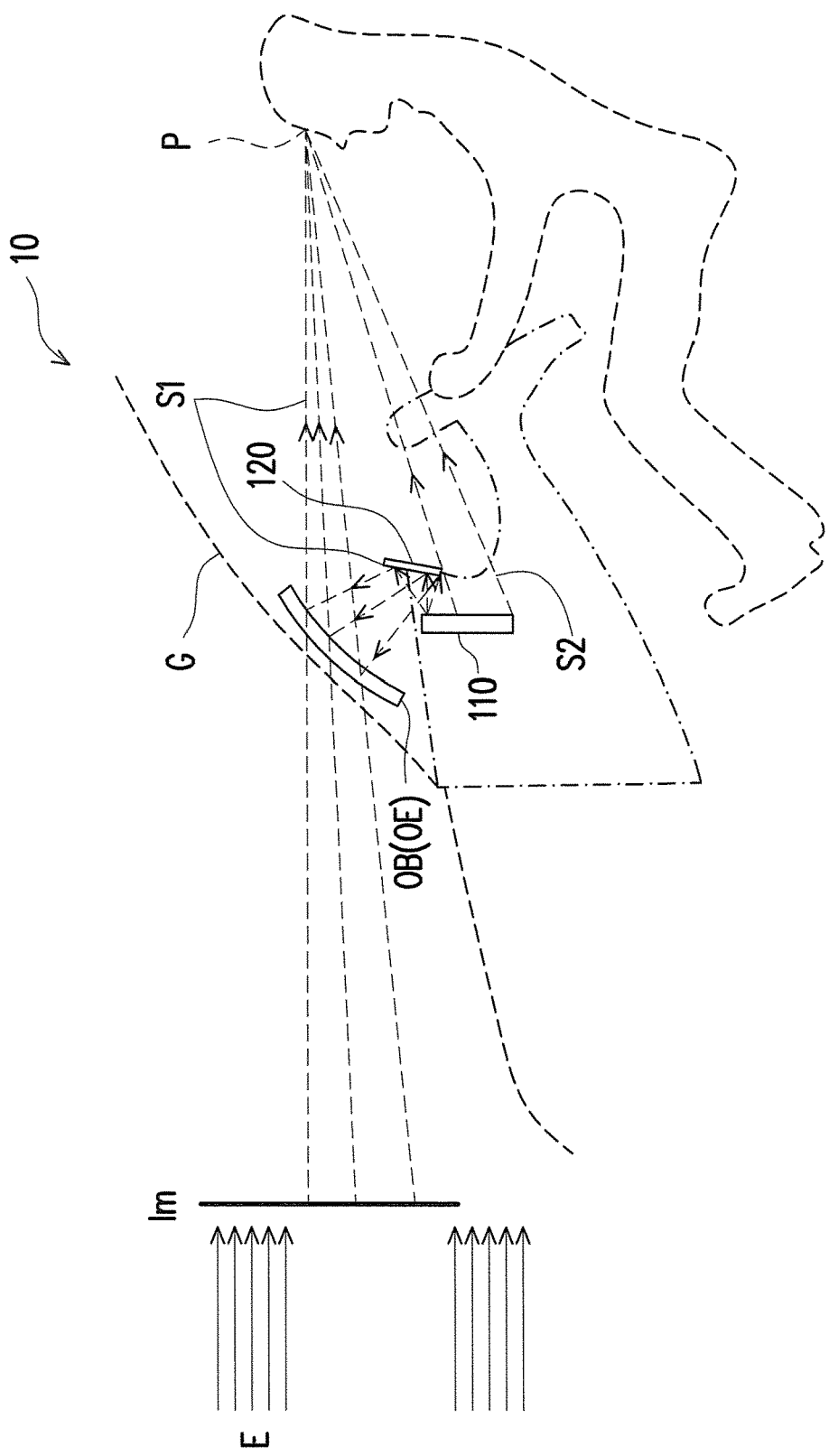
FIG. 5 and FIG. 6 are schematic diagrams illustrating the head-up display systems applied in the vehicle respectively according to two embodiments of the invention.
Figure 6:
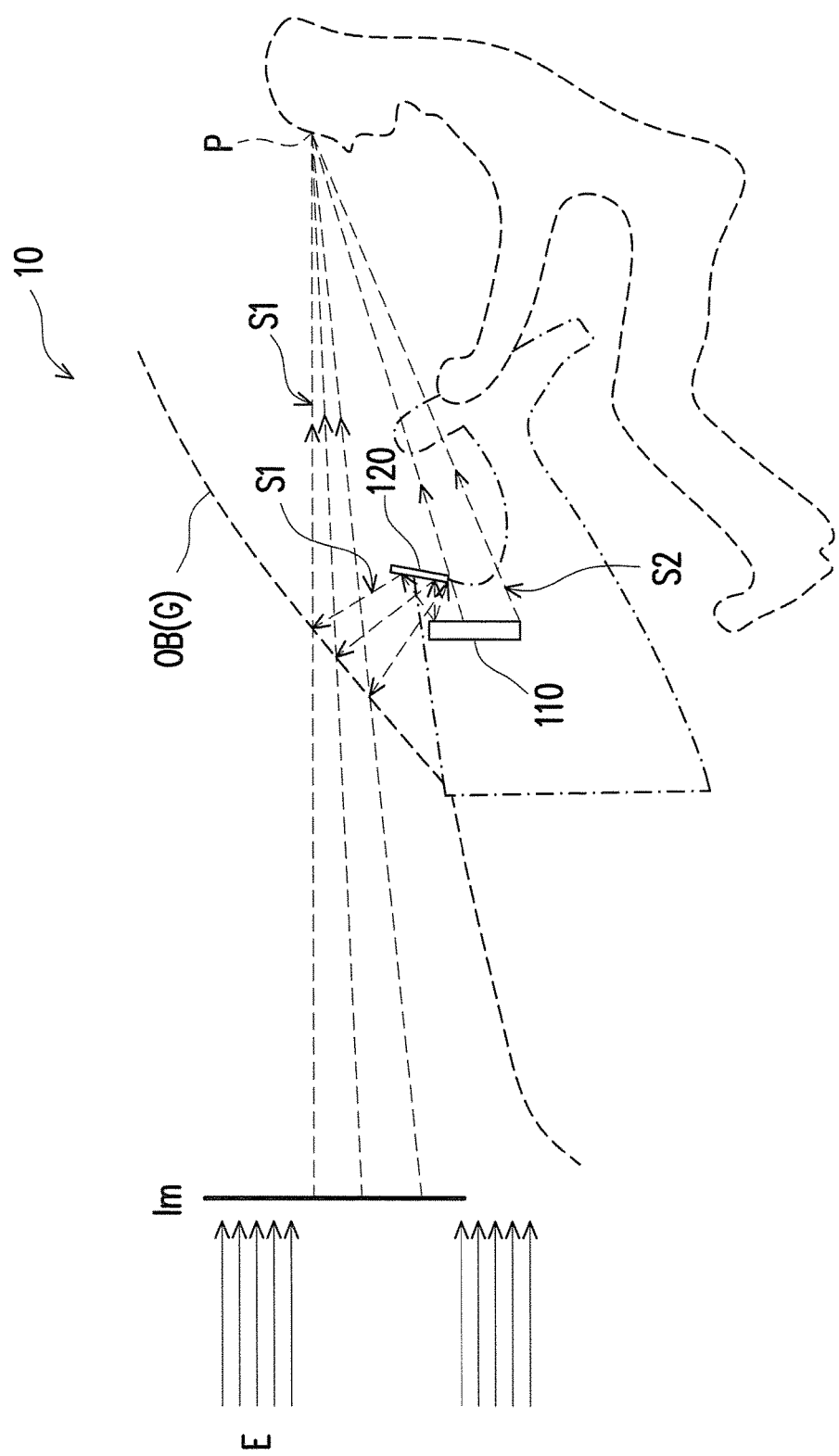

FIG. 5 and FIG. 6 are schematic diagrams illustrating the head-up display systems applied in the vehicle respectively according to two embodiments of the invention.

Referring to FIG. 5, in the embodiment, a combiner element OE serves as the target element OB. The combiner element OE is configured to receive the first image frame S1 from the reflective element 120. In the embodiment, the combiner element OE is, for example, any transparent material with semi-penetration and semi-reflection features. As such, the first image frame S1 and an ambient beam E may be combined, so that the first image frame S1 from the reflective element 120 and the ambient beam E may be further projected to a projection target P (e.g., the user's eyes). In other words, a visual effect of See-Through may be provided for the user of the head-up display system 100 of the embodiment. That is to say, the first image frame S1 is rendered on an image plane Im outside a vehicle 10 where the image plane Im is a virtual imaging plane. In the embodiment, image content provided by the first image frame S1 and background environment provided by the ambient beam E on the image plane Im may be viewed by the user at the same time. In other words, in the embodiment, the image on the image plane Im viewed by the user is an image integrated by both the first image frame S1 and the ambient beam E. In the embodiment, the first image frame S1 is a virtual image for the user.

In the embodiment, the vehicle 10 is, for example, a transportation tool such as car, aircraft, boat or train, which is not particularly limited by the invention. In addition, because the embodiment may achieve the effectiveness of saving the power consumption by using only one display panel 112 or/and adjusting the luminance of the first light source module 114 and the second light source module 116, the head-up display system 100 of the embodiment is also suitable for electric vehicles (e.g., electric motor cars).

In the foregoing embodiments, the target element OB is, for example, the combiner element OE, but the invention is not limited thereto. For instance, referring to FIG. 6, in the embodiment, the target element OB is, for example, a windshield G of the vehicle 10. Descriptions regarding other parts in FIG. 6 are similar to related descriptions provided in FIG. 5, which are not repeated hereinafter. Nonetheless, in other embodiments not illustrated, the target element OB may be, for example, car window, roof window, rear windshield or other imaging planes capable of receiving images, which all fall within the scope of the target element OB. In other embodiments, in order to render the first image frame S1 on the target element OB such as car window, roof window, rear windshield or other suitable imaging planes, the other reflective elements may be further disposed in the head-up display system 100 to bend an optical path of the first image frame S1 so that the first image frame S1 may be rendered on the target element OB such as car window, roof window, rear windshield or other suitable imaging planes. As a result, versatility of the head-up display system 100 may be improved.

Figure 7A:
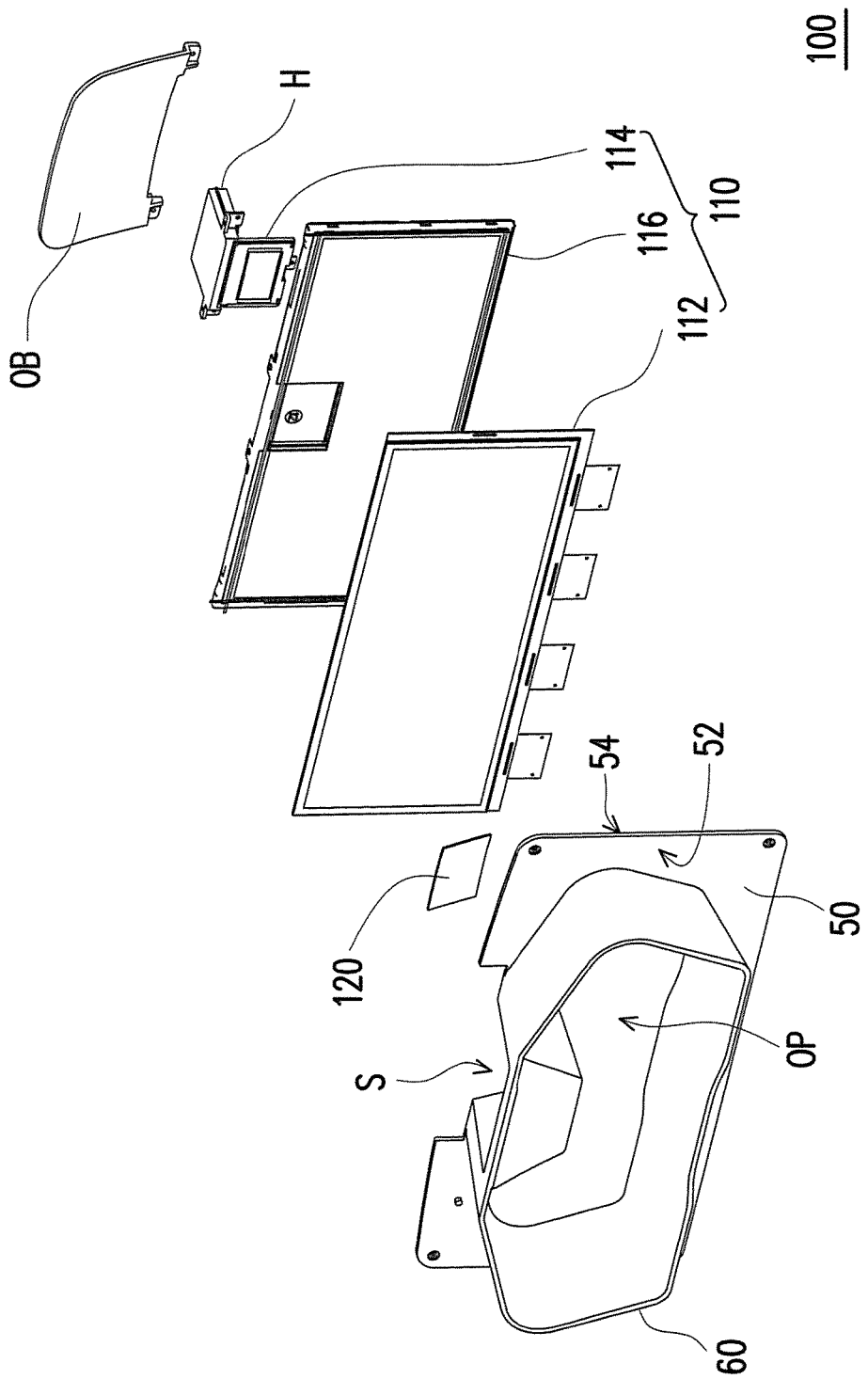
FIG. 7A and FIG. 7B are explosion diagrams illustrating head-up display systems respectively according to two embodiments of the invention.
Figure 7B:
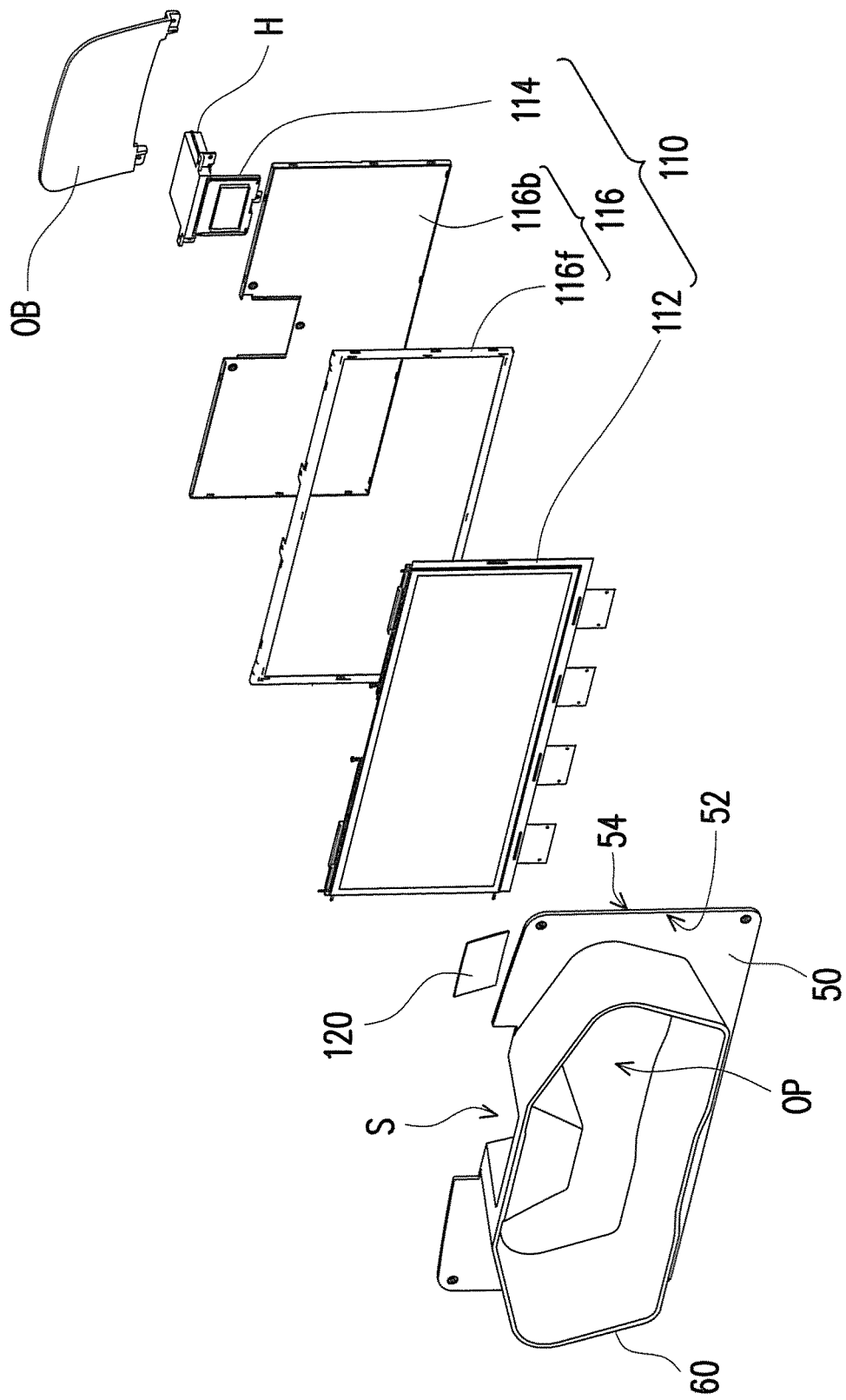

FIG. 7A and FIG. 7B are explosion diagrams illustrating head-up display systems respectively according to two embodiments of the invention.

Referring to FIG. 7A, in the embodiment, the head-up display system 100 further includes a shell 50 and a shielding member 60. The shell 50 is, for example, formed integrally with the shielding member 60. The shell 50 has two surfaces 52 and 54 at opposite sides. The shielding member 60 is disposed on the surface 52 of the shell 50 and the other surface 54 faces towards the display unit 110. Further, in the embodiment, the shell 50 has an accommodating space S caved in a direction from the surface 54 to the surface 52, for example. The reflective element 120 is located in the accommodating space S, and disposed on the surface 54 of the shell 50, for example. In the embodiment, when the reflective element 120 is the convex mirror having the convex surface facing towards the display unit 110/the target element OB, the accommodating space S may be reduced accordingly to improve space utilization rate for the head-up display system 100. Further, in the embodiment, a heat sink H may be optionally disposed on the first light source module 114 to facilitate heat dissipation for the first light source module 114, so as to prevent the heat accumulation phenomenon from happening on the first light source module 114 which is smaller in size. In the embodiment, the shielding member 60 may include an opening OP, and the second image frame S2 displayed by the second display area 110a2 in the display unit 110 is projected to the projection target (e.g., the user's eyes) through the opening OP, for example. However, size and shape of the opening OP illustrated in FIG. 7A are merely examples. Size and shape of the opening OP may be changed according to different designs, which are not particularly limited by the invention.

Referring to FIG. 7B, a head-up display system illustrated in FIG. 7B is similar to the head-up display system 100 illustrated in FIG. 7A, and the major difference between the two is that the second light source module 116 of the embodiment further includes a front cover 116f and a back cover 116b. In the embodiment, a plurality of optical elements (not illustrated) may be further provided between the front cover 116f and the back cover 116b. The optical elements include, for example, light guide plate, LED light bar, LED light board, reflective plate, diffuser plate, polarizing plate, prism plate or other suitable optical films. In the embodiment, the back cover 116b may be used to carry and protect aforesaid optical elements, and the front cover 116f may be used to secure and protect aforesaid optical elements.

In the embodiment, implementation regarding the first light source module 114 being disposed in the head-up display system 100 includes, for example, locking or engaging the first light source module 114 to the second light source module 116 and the display panel 112 through a plurality of locking elements or engaging elements, but the invention is not limited thereto.

Figure 8:
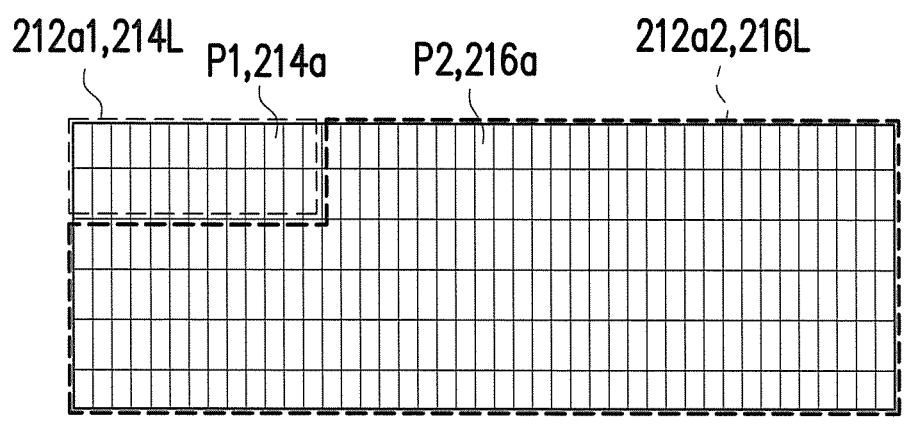
FIG. 8 is a schematic diagram illustrating the display panel, the first light source module and the second light source module in the display unit according to yet another embodiment of the invention.

FIG. 8 is a schematic diagram illustrating the display panel, the first light source module and the second light source module in the display unit according to another embodiment of the invention.

In the embodiment, the first light source module and the second light source module are not necessarily limited to be the backlight module as mentioned above. For instance, referring to FIG. 8, the first light source module has a plurality of first organic light emitting diode units 214a, and the second light source module has a plurality of second organic light emitting diode units 216a. A first pixel area 212a1 has a plurality of first pixel units P1, and a second pixel area 212a2 has a plurality of second pixel units P2. Specifically, in the embodiment, each of the first organic light emitting diode units 214a in the first light source module is corresponded to each of the first pixel units P1 in the first pixel area 212a1 (e.g., corresponded in one-to-one manner), and each of the second organic light emitting diode units 216a in the second light source module is corresponded to each of the second pixel units P2 in the second pixel area 212a2 (e.g., corresponded in one-to-one manner). "P1,214a" marked in FIG. 8 indicates that the first pixel unit P1 and the first organic light emitting diode unit 214a may be stacked on the same position illustrated in FIG. 8, and the meaning of "P2,216a" is similar to that of "P1,214a", which is not repeated hereinafter. Furthermore, each of the first organic light emitting diode units 214a in the first light source module is configured to emit light beam for providing a first light source 214L, and each of the second organic light emitting diode units 216a in the second light source module is configured to emit light beam for providing a second light source 216L. On the other hand, "212a1,214L" marked in FIG. 8 indicates that the first light source module provides the first light source 214L to the first pixel area 212a1, and the meaning of "212a2,216L" is similar to that of "212a1, 214L", which is not repeated hereinafter. In other words, in the embodiment, the first light source 214L provided by the first light source module and the second light source 216L provided by the second light source module are corresponded to the first pixel area 212a1 and the second pixel area 212a2 respectively, and each of the first organic light emitting diode units 214a and each of the second organic light emitting diode units 216a are corresponded to each of the first pixel units P1 and each of the pixel units P2 in a display panel 212 respectively. Nevertheless, enough teaching, suggestion, and implementation illustration for implementation of the organic light emitting diode units may be obtained with reference to common knowledge in the related art, which is not repeated hereinafter. The advantages of compact and slimness may be provided since the light sources are provided to the display panel 212 by using the first organic light emitting diode unit 214a in the first light source module and the second organic light emitting diode units 216a in the second light source module in the embodiment. In the embodiment, a material of the display panel 212 is, for example, a glass, but the invention is not limited thereto. In the embodiment, the first light source module and the second light source module are disposed on the display panel 212, for example.

In the display panel 212 of the embodiment, for example, the first pixel area 212a1 is located at upper left corner of the display panel 212 (e.g., an area surrounded by thin dash lines), and the second pixel area 212a2 is located on an area excluding the first pixel area 212a1 (e.g., an area surrounded by thick dash lines). However, the first pixel area 212a1 and the second pixel area 212a2 may locate at any areas in the display panel 212. The first pixel area 212a1 is not overlapping with the second pixel area 212a2. In other words, the areas illustrated in FIG. 8 are merely examples, and the invention is not limited thereto.

Naturally, in other embodiments not illustrated, based on different design requirements, one of the first light source module and the second light source module may be the backlight module (the direct type backlight module, the side incident type or the hybrid type backlight module) and another of the first light source module and the second light source module may be formed by the organic light emitting diode units, which are not particularly limited by the invention.

In summary, the embodiments of the invention may achieve at least one of the advantages or effects listed below. The head-up display system according to the embodiments of the invention uses the first pixel area and the second pixel area in one single display panel together with the first light source module and the second light source module to make the first display area and the second display area of one single display unit display the first image frame and the second image frame, respectively. In the embodiments of the invention, the first image frame displayed by the first display area is reflected to the target element by the reflective element, and the first image frame rendered on the target element serves as the head-up display frame. In the embodiments of the invention, the second image frame displayed by the second display area serves as the dashboard display frame of the dashboard display panel. As such, the head-up display system according to the embodiments of the invention may further simplify its components, avoid redundant assembly steps, save the space inside the vehicle, and reduce manufacturing costs as well as manufacturing hours. Further, the head-up display system according to embodiments of the invention is suitable for various vehicles. In addition, the head-up display system according to the embodiments of the invention may save the power consumption, and is therefore suitable for electric vehicles (e.g., electric motor cars). Furthermore, based on different requirements from the user, the first image frame and the second image frame may provide suitable luminance and viewing angles by designing/adjusting the luminance and viewing angles of the first light source module and the second light source module according to the embodiments of the invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-up display system, comprising:
   a display unit, having a first display area and a second display area, and comprising:
   a display panel, having a first pixel area and a second pixel area;
   a first light source module, adapted to provide a first light source, the first light source being corresponded to the first pixel area to make the first display area display a first image frame; and
   a second light source module, adapted to provide a second light source, the second light source being corresponded to the second pixel area to make the second display area display a second image frame; and
   a reflective element, located on a transmission path of the first image frame and not located on a transmission path of the second image frame, and adapted to reflect the first image frame from the first display area to a target element;
   a shell, having a first surface, a second surface at opposite sides and an accommodating space caved in a direction from the second surface to the first surface; and
   a shielding member, disposed on the first surface of the shell and the second surface of the shell faces towards the display unit,
   wherein the reflective element is located in the accommodating space and disposed on the second surface of the shell, and
   wherein the shielding member includes an opening separated from the accommodating space by a sidewall of the shielding member, and the second image frame displayed by the second display area in the display unit is projected to the projection target through the opening.

2. The head-up display system of claim 1, wherein the first display area is not overlapping with the second display area, and the first display area is coplanar with the second display area.

3. The head-up display system of claim 1, wherein the second display area of the display unit is a dashboard display panel.

4. The head-up display system of claim 1, wherein the first light source module and the second light source module are a first backlight module and a second backlight module respectively, the first pixel area is located on a transmission path of the first light source provided by the first backlight module, the second pixel area is located on a transmission path of the second light source provided by the second backlight module, and the first pixel area is coplanar with the second pixel area.

5. The head-up display system of claim 1, wherein the first light source module is one selected from a direct type backlight module, a side incident type backlight module and a hybrid type backlight module, and the second light source module is one selected from the direct type backlight module, the side incident type backlight module and the hybrid type backlight module.

6. The head-up display system of claim 1, wherein the first light source module has a plurality of first organic light emitting diode units, the second light source module has a plurality of second organic light emitting diode units, the first organic light emitting diode units are corresponded to a plurality of first pixel units in the first pixel area respectively, and the second organic light emitting diode units are corresponded to a plurality of second pixel units in the second pixel area respectively.

7. The head-up display system of claim 1, further comprising:
   a combiner element, serving as the target element, configured to receive the first image frame from the reflective element, and adapted to combine the first image frame and an ambient beam and project the first image frame from the reflective element and the ambient beam to a projection target.

8. The head-up display system of claim 1, wherein the target element comprises a windshield of a vehicle.

9. The head-up display system of claim 1, wherein a luminance of the first light source module is not equal to a luminance of the second light source module.

10. The head-up display system of claim 1, wherein a luminance of the first light source module is substantially 13000 nits, and a luminance of the second light source module is substantially between 800 and 1000 nits.

11. The head-up display system of claim 1, wherein a luminance of the first light source module is substantially equal to a luminance of the second light source module.

12. The head-up display system of claim 1, wherein a viewing angle of the first light source module is not equal to a viewing angle of the second light source module.

13. The head-up display system of claim 1, wherein a viewing angle of the first light source module in vertical direction is substantially 26 degrees, a viewing angle of the first light source module in horizontal direction is substantially 44 degrees, a viewing angle of the second light source module in vertical direction is substantially 45 degrees, and a viewing angle of the second light source module in horizontal direction is substantially 45 degrees.

14. The head-up display system of claim 1, wherein a viewing angle of the first light source module is substantially equal to a viewing angle of the second light source module.

15. A head-up display system, comprising:
   a display unit, having a first display area and a second display area, and comprising:
   a display panel, having a first pixel area and a second pixel area, wherein the display panel is a thin film transistor liquid crystal display;
   a first light source module, adapted to provide a first light source, the first light source being corresponded to the first pixel area to make the first display area display a first image frame; and
   a second light source module, adapted to provide a second light source, the second light source being corresponded to the second pixel area to make the second display area display a second image frame, wherein the size of the first light source module is smaller than the size of the second light source module;
   a reflective element, located on a transmission path of the first image frame and not located on a transmission path of the second image frame, and adapted to reflect the first image frame from the first display area to a target element;
   a heat sink, disposed on the first light source module to facilitate heat dissipation for the first light source module; and
   a shell, adapted to carry the reflective element, and the display panel is located between the heat sink and the shell, wherein the shell does not directly connect to the heat sink.

* * * * *